United States Patent
Shibuya

(10) Patent No.: US 7,522,882 B2
(45) Date of Patent: Apr. 21, 2009

(54) PRESENCE UPDATE SYSTEM AND METHOD THEREFOR, AND MOBILE COMMUNICATION TERMINAL AND NON-CONTACT COMMUNICATION APPARATUS USED THEREFOR

(75) Inventor: Atsushi Shibuya, Tokyo (JP)

(73) Assignee: Nec Corporation (JP)

( * ) Notice: Subject to any disclaimer, the term of this patent is extended or adjusted under 35 U.S.C. 154(b) by 496 days.

(21) Appl. No.: 11/264,724

(22) Filed: Nov. 1, 2005

(65) Prior Publication Data

US 2006/0099911 A1 May 11, 2006

(30) Foreign Application Priority Data

Nov. 10, 2004 (JP) ............................ 2004-325784

(51) Int. Cl.
*H04B 7/00* (2006.01)
(52) U.S. Cl. .................... 455/41.2; 455/435.1; 709/228
(58) Field of Classification Search ................ 455/41.2, 455/435.1; 709/228
See application file for complete search history.

(56) References Cited

U.S. PATENT DOCUMENTS 6,650,894 B1 11/2003 Berstis et al.

| 2003/0078080 A1 | 4/2003 | Miriyala |
| 2004/0002343 A1 | 1/2004 | Brauel et al. |
| 2005/0021773 A1* | 1/2005 | Shiga et al. ................. 709/228 |

FOREIGN PATENT DOCUMENTS

| EP | 1 437 909 A2 | 7/2004 |
| JP | 2003-274440 | 9/2003 |

OTHER PUBLICATIONS

Search Report issued by European Patent Office on Feb. 27, 2006 in connection with corresponding application No. 05024110.8-2412.

* cited by examiner

*Primary Examiner*—Charles N Appiah
*Assistant Examiner*—Michael T Vu
(74) *Attorney, Agent, or Firm*—Ostrolenk, Faber, Gerb & Soffen, LLP

(57) ABSTRACT

A burden on a user is reduced as much as possible in updating presence, and the presence is automatically updated. Near-field communication is performed with a non-contact communication apparatus installed in each place by means of the low-power-output transmission/receiving section of a mobile phone to acquire, from the non-contact communication apparatus, information about the place where it is installed. The mobile phone compares presence information registered with a presence management table and the received installation place information, generates presence information based on presence information corresponding to the installation place information, and transmits the presence information with the use of a transmission/receiving section.

20 Claims, 10 Drawing Sheets

FIG. 3

CONTENTS OF PRESENCE MANAGEMENT TABLE 18

| INSTALLATION PLACE (ID TYPE) | PRESENCE | |
|---|---|---|
| | LOCATION / CONDITION | COMMUNICATION PERMISSION / REFUSAL |
| HOME | USER'S OWN ROOM | PERMITTED |
| HOME / BED ROOM | BED ROOM | REFUSED |
| COMPANY | COMPANY | PERMITTED |
| COMPANY / MEETING ROOM | DURING MEETING | REFUSED |
| COMPANY / USER'S OWN DESK | COMPANY | PERMITTED |
| TRAIN | IN TRAIN | REFUSED |
| STATION | ※ | PERMITTED |
| CAR | DURING DRIVING | REFUSED |
| UNREGISTERED | ※ | ※ |

FIG. 4

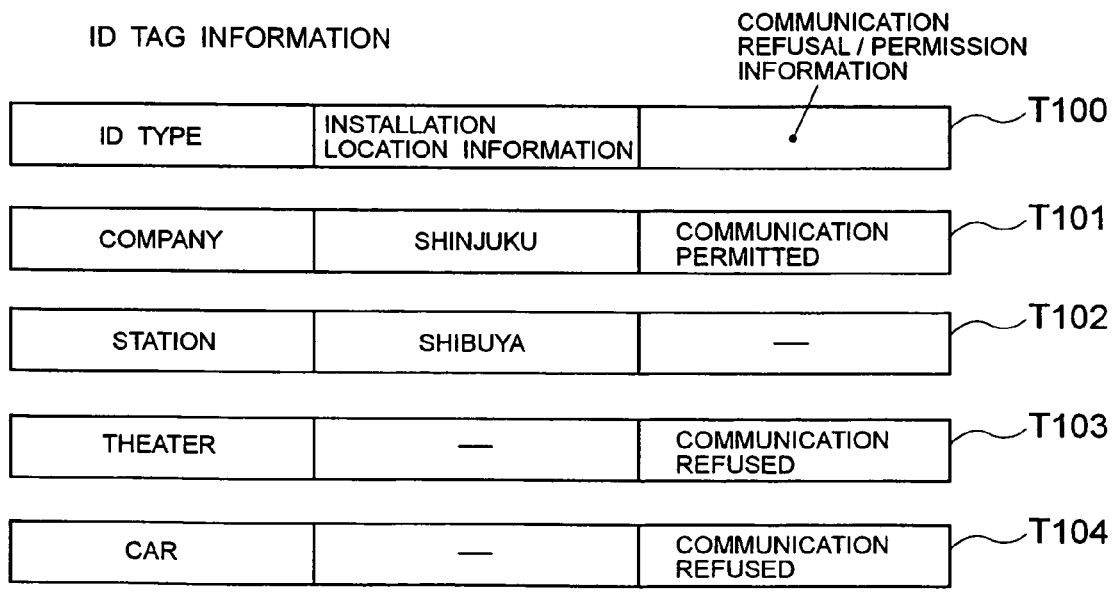

PRESENCE UPDATE SYSTEM AND METHOD THEREFOR, AND MOBILE COMMUNICATION TERMINAL AND NON-CONTACT COMMUNICATION APPARATUS USED THEREFOR

BACKGROUND OF THE INVENTION

1. Field of the Invention

The present invention relates to a presence update system and method therefor, and a mobile communication terminal and a non-contact communication apparatus used therefor, in particular, to a presence update system for generating up-to-date presence information indicating the location and condition of a user of a mobile communication terminal to update presence information with the presence information.

2. Description of the Prior Art

Recently, an IM (Instant Message) service and a PoC (Push to talk over Cellular) service have spread as services using a mobile phone. The IM service is a service like e-mail but is different from the e-mail in that it transmits and receives data in real time. The PoC service is a service having a function like the function of a transceiver, which is capable of performing one-to-one or one-to-many communication utilizing a mobile phone network.

In such services, it is necessary to check the condition of a communication counterpart. In communication means such as PoC, it is necessary to check the condition of a counterpart (referred to as "presence") before starting communication, unlike a telephone. This is because, if the counterpart is not in a condition capable of communication, no reply is returned even if PoC is used to call the counterpart, and communication is not established. It is also necessary that the presence should always indicate the up-to-date condition. Even if the presence is checked and communication is requested, communication is not established unless the communication counterpart has updated the presence.

This problem can be solved by continuously updating the presence. However, since a user is required to perform some operations to update the presence, the presence is often not updated for some time in the case of a mobile phone always carried with the user. Thus, though the presence is very important and useful in communication between mobile phones, it actually is not effectively utilized.

With reference to Japanese Patent Laid-Open No. 2003-274440, a technique is disclosed in which the presence of a mobile telephone is updated, transmitted to a server and registered with the server, with the use of a location information service of a base station for a mobile communication network.

In the case of utilizing communication by the above-described PoC service, a communication counterpart may be selected by checking the presence, which is the condition of the communication counterpart. This presence notifies information about the location and condition of the counterpart, whether communication is possible or not, and the like, which is important information for a mobile phone which moves together with a user, as described above.

However, the user of a mobile phone is required to change the presence by a manual operation according to his condition and location, and input by the mobile phone is annoying and troublesome. Furthermore, since the user always carries the mobile phone to use it, the condition or location of the user frequently changes. It is a heavy burden for the user to change the presence every time his condition or location changes. As a result, the user feels it troublesome to input the presence, and the presence is left unupdated.

According to the technique in Japanese Patent Laid-Open No. 2003-274440, the presence is automatically updated with the use of a location information service of a base station. However, though the location information is automatically updated, information about the condition of a user must be updated by operation by the user, which is, after all, a burden on the user.

The object of the present invention is to provide a presence update system capable of eliminating a manual operation by a user to reduce a burden on the user.

BRIEF SUMMARY OF THE INVENTION

A presence update system according to the present invention is a presence update system for transmitting up-to-date presence information indicating the location or the condition of a user of a mobile communication terminal, to a presence management apparatus, the system comprising: a non-contact communication apparatus and capable of transmitting information indicating at least an installation place; and the mobile communication terminal comprising: registration means with which information indicating the location of the user or the condition of the user at the location is registered in advance; receiving means for receiving information from the non-contact communication apparatus; and transmission means for generating the presence information based on information in the registration means corresponding to the installation place in the received information and transmitting the presence information to the presence management apparatus.

A presence update method according to the present invention is a presence update method for transmitting up-to-date presence information indicating the location or the condition of a user of a mobile communication terminal, to a presence management apparatus, wherein: there is provided a non-contact communication apparatus and capable of transmitting information indicating at least an installation place; and the method comprising: a receiving step of receiving information from the non-contact communication apparatus in the mobile communication terminal; a generation step of generating the presence information based on registration information corresponding to the installation place in the information received by the receiving step from among registration information in registration means with which information about the location of a user or the condition of the user at the location is registered in advance; and a transmission step for transmitting the generated information to the presence management apparatus.

A mobile communication terminal according to the present invention is a mobile communication terminal adapted to transmit up-to-date presence information indicating the location or the condition of a user, to a presence management apparatus, the mobile communication terminal comprising: registration means with which information indicating the location of the user or the condition of the user at the location is registered in advance; receiving means for receiving information indicating at least an installation place transmitted from a non-contact communication apparatus; and transmission means for generating the presence information based on information in the registration means corresponding to the installation place in the received information and transmitting the presence information to the presence management apparatus.

A non-contact communication apparatus according to the present invention is a non-contact communication apparatus in a presence update system for transmitting up-to-date presence information indicating the location or the condition of a user of a mobile communication terminal, to a presence management apparatus; the apparatus being installed at a predetermined position, and comprising means for transmitting information indicating at least the installation place to the mobile communication terminal.

A program according to the present invention is a program for causing a computer to perform the operation of a mobile communication terminal adapted to transmit up-to-date presence information indicating the location or the condition of a user, to a presence management apparatus, the program comprising: a process of receiving information indicating at least an installation place and transmitted from a non-contact communication apparatus; and a process of generating the presence information based on information corresponding to the installation place in the received information, among registration information in registration means with which information about the location of a user or the condition of the user at the location is registered in advance, and transmitting the presence information to the presence management apparatus.

BRIEF DESCRIPTION OF THE DRAWINGS

FIG. 3 shows an example of a presence management table 18;

FIG. 4 shows the contents and an example of ID tag information;

DETAILED DESCRIPTION OF THE PREFERRED EMBODIMENTS

Figure 1:
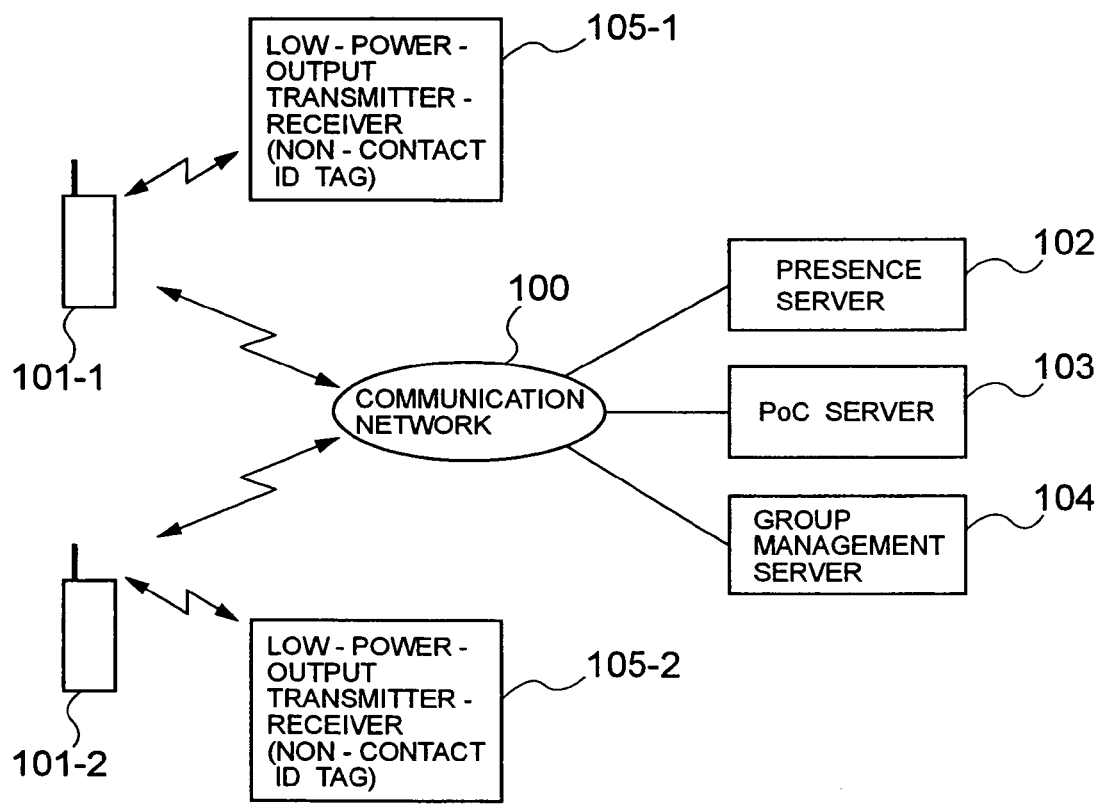
FIG. 1 is a system configuration diagram of an embodiment of the present invention.

Embodiments of the present invention will be described in detail below referring to drawings. FIG. 1 is a system configuration diagram showing an embodiment of the present invention. Referring to FIG. 1, mobile phones 101-1 and 101-2 are capable of connecting to a presence server 102, a PoC server 103 and a group management server 104 via a mobile communication network 100.

The presence server 102 is a server which manages the current condition of the mobile phones, and the mobile phones are able to notify and update presence, which is the condition thereof, to the presence server 102. The PoC server 103 is a server which controls communication between mobile phones. Specifically, it performs communication control such as control of the right to speak. The group management server 104 is a server which registers a communication counterpart and is able to refer to the presence of a registered communication counterpart in the presence server 102.

The mobile phone is capable of inquiring of the group management server 104 to check the presence of other mobile phones registered with the group it belongs to.

Low-power-output transmitter-receivers 105-1 and 105-2 are apparatuses capable of performing wireless near-field communication with the mobile phones 101-1 and 101-2, and infrared-ray communication, Bluetooth, Wireless Lan, a non-contact ID tag (an RF-ID tag) are used therefor. In this example, they will be described as non-contact ID tags. Non-contact ID tags 105-1 and 105-2 are installed at various places, for example, in homes, in companies, in transportation such as cars, buses and trains, in stations and in amusement facilities such as theaters and movie theaters. In homes, they are installed in a bed room or a living room, and in companies, they are installed at desks or in a meeting room. In the non-contact ID tag, wireless tag information is held in advance, including installation place information and installation purposes, and the wireless tag information can be read by an RF-ID reader. The mobile phone is provided with the RF-ID reader function.

Figure 2:
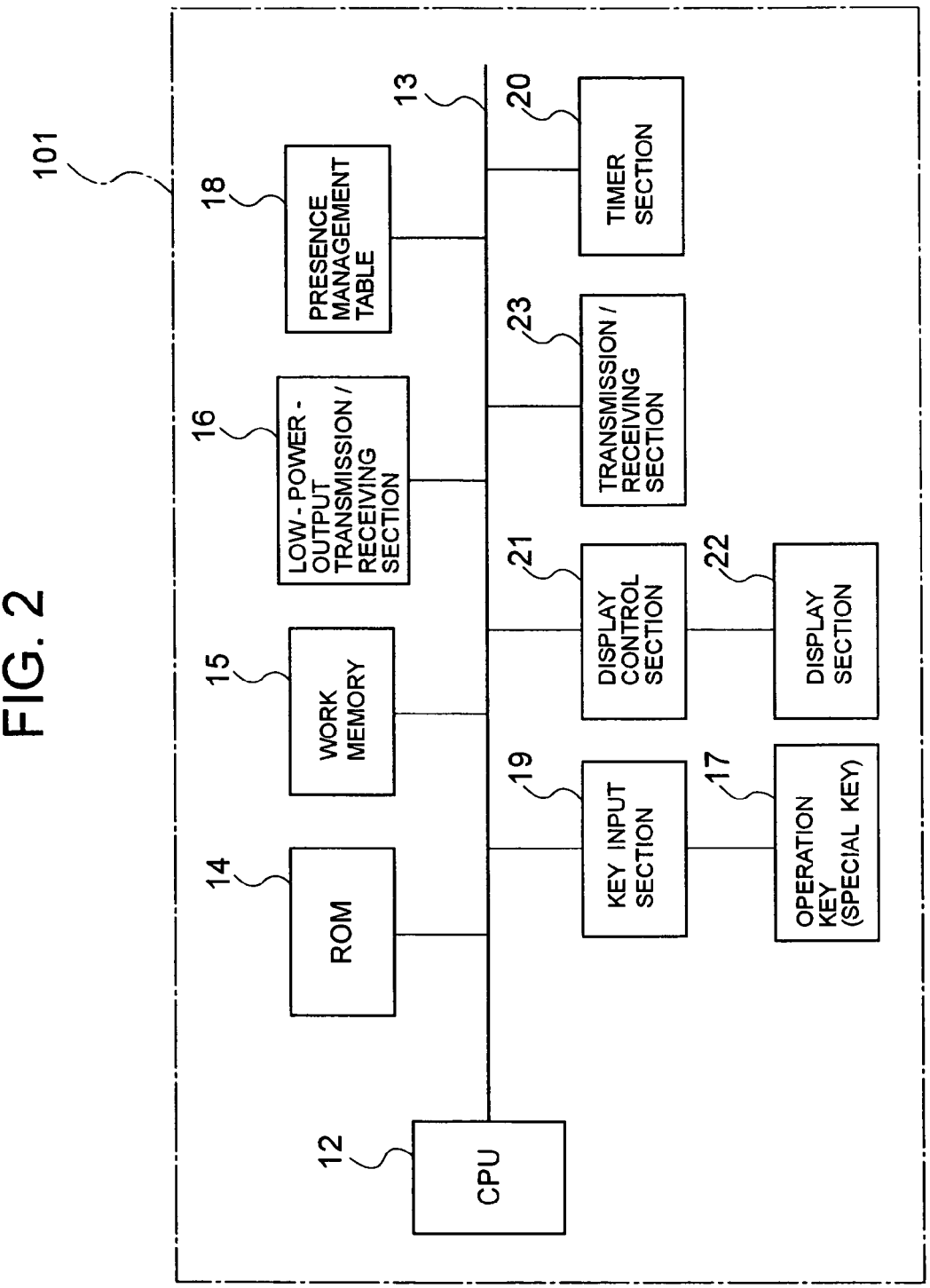
FIG. 2 is a functional block diagram of a mobile phone in the present invention.

FIG. 2 shows a functional block diagram of the mobile phone shown in FIG. 1. Referring to FIG. 2, a CPU (which is a control section and a central processing unit) 12 is connected to each of sections 14 to 23 within the apparatus via a bus 13 to control each of the sections 15 to 23 in accordance with various control programs stored in the ROM 14. The ROM 14 is, as described above, a read-only memory in which fixed data such as dictionaries used for kana character conversion and the like is stored in addition to the control programs for operation of the CPU 12.

The work memory 15 is a RAM (random access memory), for storing data to be temporarily required by the CPU 12 to execute the program. Image data used for editing used when sending an e-mail is also stored in a predetermined area in this work memory 15.

The low-power-output transmission/receiving section 16 is a circuit for non-contactly transmitting and receiving data between apparatuses closely located with a distance of about 100 cm. As described above, infrared-ray communication, Bluetooth, Wireless Lan, an RF-ID reader may be used therefor, and in the example described with reference to FIG. 1, the circuit is assumed to be an RF-ID reader. This circuit is configured to transmit ID information specific to the mobile phone and receive specific wireless tag information stored in the non-contact ID tag of the low-power-output transmitter-receivers 105-1 and 105-2 which is a communication counterpart.

The presence management table 18 is a management table for setting the presence of the mobile phone and is configured on a non-volatile memory. It is possible to change the contents of the presence management table 18 by a user's operation, and the contents can be transmitted from the transmission/receiving section 23 externally to the communication network 100.

The key input section 19 is an input circuit for accepting a key input from the operation keys 17 which include a special key. The timer section 20 is for notifying an event at a set time interval. The display control section 21 is a control circuit for controlling display of the display section 22, and the display section 22 is a black-and-white or color liquid-crystal panel or a display device by organic EL (electroluminescence) or the like.

The transmission/receiving section 23 is a circuit for wirelessly transmitting and receiving data and is used for a longer communication distance in comparison with the low-power-output transmission/receiving section 16. It is mainly used for communication between a mobile phone and a base station not shown.

FIG. 3 shows the contents of each entry item of the presence management table 18 in FIG. 2. The presence management table 18 has information for each of installation place (ID type), location/condition and communication permission/refusal, for each entry. The information for location/condition and communication permission/refusal indicates presence, and it is assumed that a user can change the setting of the contents of the presence. Reference symbol T100 in FIG. 4 denotes an example of inherent wireless tag information generated by the non-contact ID tags 105-1 and 105-2, and an ID type, installation location information and communication refusal/permission information are included therein.

The ID type shows the type of a place where a non-contact ID tag is installed. For example, as in examples denoted by reference symbols T101 to T104, the ID type is information about the type of an installation place (environment type), such as a company, a station, a theater and a car. The installation location information is information indicating the location of an installation place. If the ID type (installation place type) is a company, then the information shows Shinjuku, where the company is established. If the ID type is a station, then the information shows Shibuya, which is the station name. The communication refusal/permission information is information showing whether communication is permitted or prohibited at the place.

Figure 5:
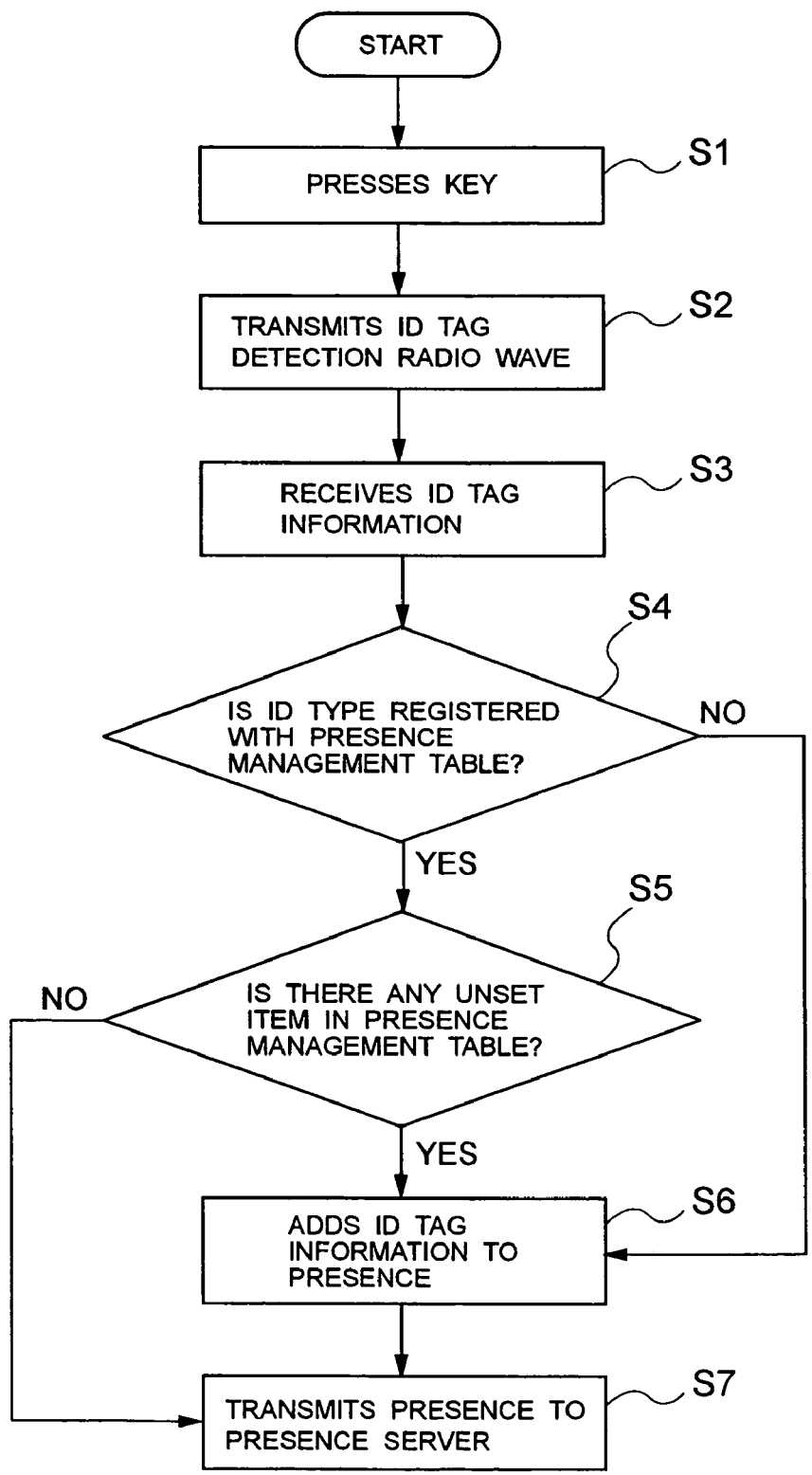
FIG. 5 is a flowchart showing the operation of an embodiment of the present invention.

The operation of an embodiment of the present invention will be described below. FIG. 5 is a flowchart in the case where the operation is started by the user pressing a special key among the operation keys 17. In response to the user pressing the key (step S1), a radio wave is generated from the low-power-output transmission/receiving section 16 to receive wireless tag information of a non-contact ID tag 105 (step S2). The non-contact ID tag 105 receives this radio wave and transmits inherent wireless tag (ID tag) information recorded therein utilizing the received radio wave.

The low-power-output transmission/receiving section 16 of the mobile phone 101 receives this ID tag information (step S3). This ID tag information is information as shown in FIG. 4. This ID tag information may be immediately transmitted to the presence server 102 with a user ID attached thereto. However, there may be a case where the user does not want to disclose specific information such as the current location or a case where the user wants to attach information showing communication permission/refusal. The presence management table 18 is provided within the mobile phone 101 in consideration of such cases.

Figure 6:
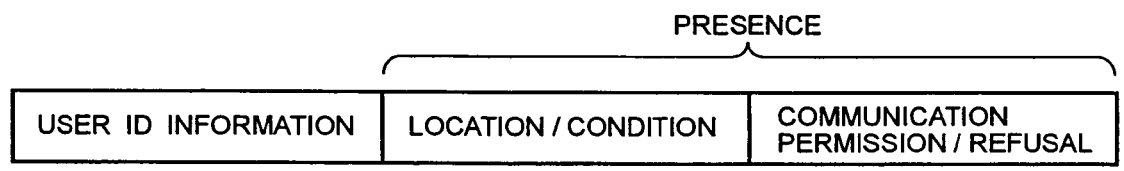
FIG. 6 shows the contents of presence information.

By comparing the received ID tag information with the presence management table 18 (step S4) to determine whether the ID types correspond to each other. If they correspond to each other, then it is checked whether there is any unset item for each entry item the ID type of which corresponds to the ID tag information, in the presence management table 18 (step S5). If there is not any unset item, the location/condition and the condition of communication permission/refusal set in the presence management table 18 are transmitted to the presence server 102 as presence together with the user ID information, as shown in FIG. 6 (step S7).

For example, if the ID type of the ID tag information received from the non-contact ID tag 105 is "company" in the ID tag information T101 in FIG. 4, then the setting for each item of "location/condition" and "communication permission/refusal" of the entry the ID type of which is "company" in the presence management table in FIG. 3 is read, and presence is transmitted to the presence server 102 as "company" and "permitted".

If the ID type of the ID tag information received from the non-contact ID tag 105 is "station" in the ID tag information T102 in FIG. 4, then each item for "location/condition" and "communication permission/refusal" of the entry the ID type of which is "station" in the presence management table 18 in FIG. 3 is read. In this case, since nothing is set for the item "location/condition", determination at step S5 in FIG. 5 is "Yes". Accordingly, at the next step S6, "Shibuya" set for the item "location/condition" in the received ID tag information T102 is set for the item "location/condition" of the presence in FIG. 6, and the presence is transmitted to the presence server 102 (step S7).

The presence server 102 updates presence to be up-to-date based on the notified presence information. If nothing is especially registered as "location/condition" and "communication permission/refusal" in the presence management table 18, then the received ID tag information is transmitted to the presence server.

According to the operation described above, the user can update his presence by an extremely easy operation of simply pressing a key. The PoC server 103 can determine communication permission/refusal shown in the presence notified to the presence server 102 to control transmission to the counterpart the communication to whom is refused.

Figure 7:
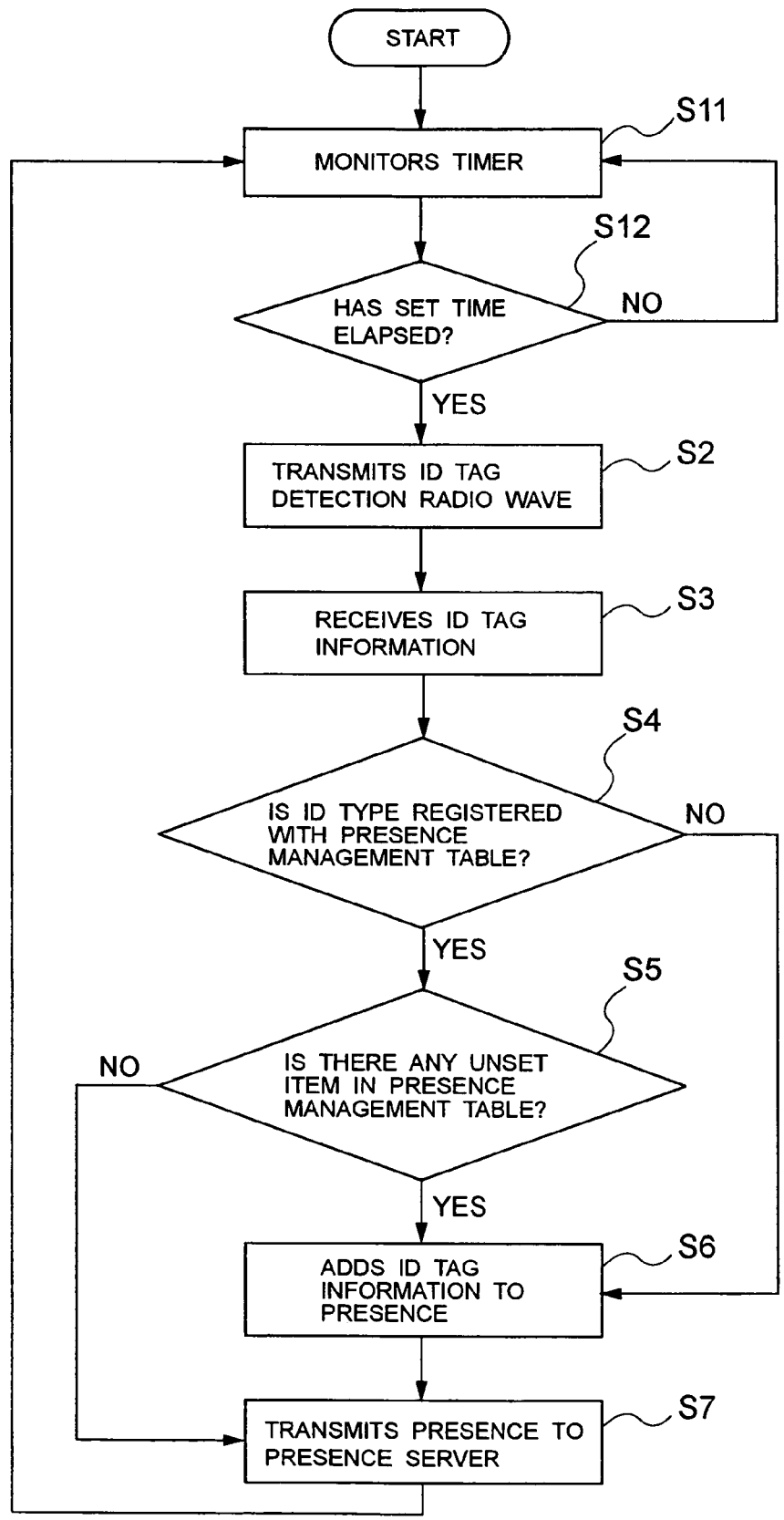
FIG. 7 is a flowchart showing the operation of another embodiment of the present invention.

FIG. 7 is a flowchart showing the operation of another embodiment of the present invention. The system configuration and the configuration of a mobile phone are similar to those in FIGS. 1 and 2. In FIG. 7, steps equivalent to those in FIG. 5 are denoted by the same reference symbols. Though update of presence is triggered by a user pressing a key in the example of FIG. 5, presence is automatically updated with the use of a timer in this example. Accordingly, timer is monitored by the timer section 20 (step S11). When time set in advance comes (step S12), an event is generated by the timer section 20, and this triggers a radio wave to be originated from the low-power-output transmission/receiving section 16 to read ID tag information (step S2). Subsequently, the steps S3 to S7 in FIG. 5 are performed. This example is advantageous in that a user operation is not required at all.

Figure 8:
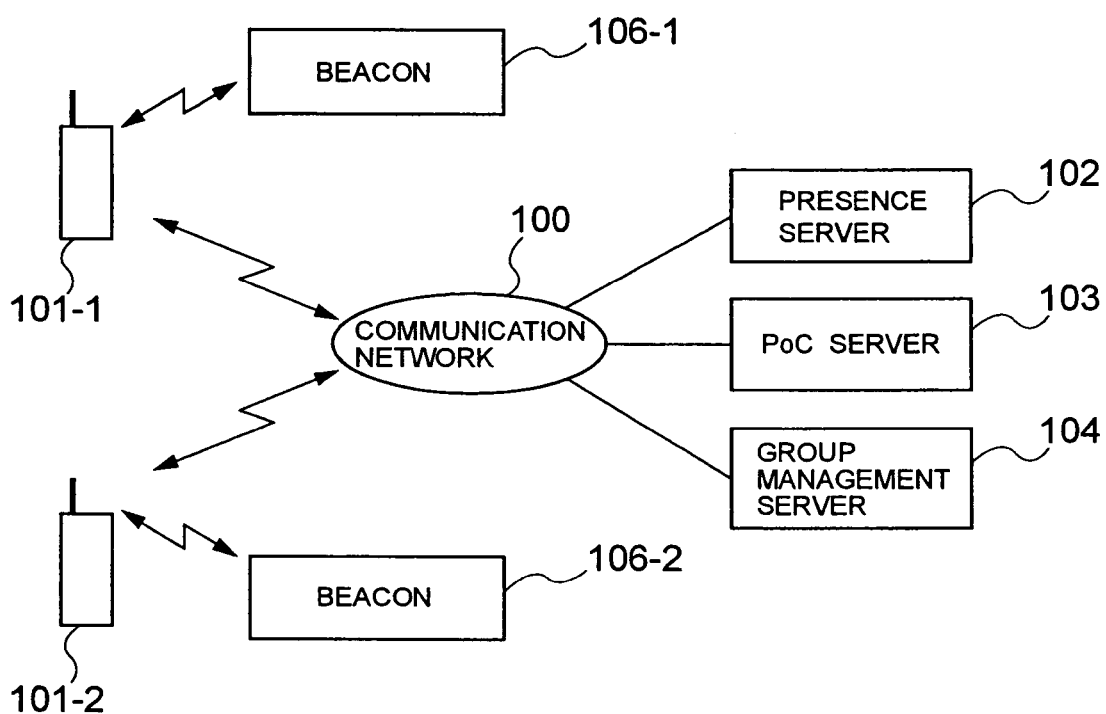
FIG. 8 is a system configuration diagram of a still another embodiment of the present invention.

FIG. 8 is a system configuration diagram of a still another embodiment of the present invention, and sections equivalent to those in FIG. 1 are denoted by the same reference numerals, and description there of will be omitted. In this example, beacons 106-1 and 106-2 are provided instead of the low-power-output transmitter-receivers 105-1 and 105-2 of FIG. 1. A beacon has a function of repeatedly transmitting the same information and is a system mainly used for air control or shipping control. In this example, beacons with a low transmission output and a transmission range of several meters are used.

Figure 9:
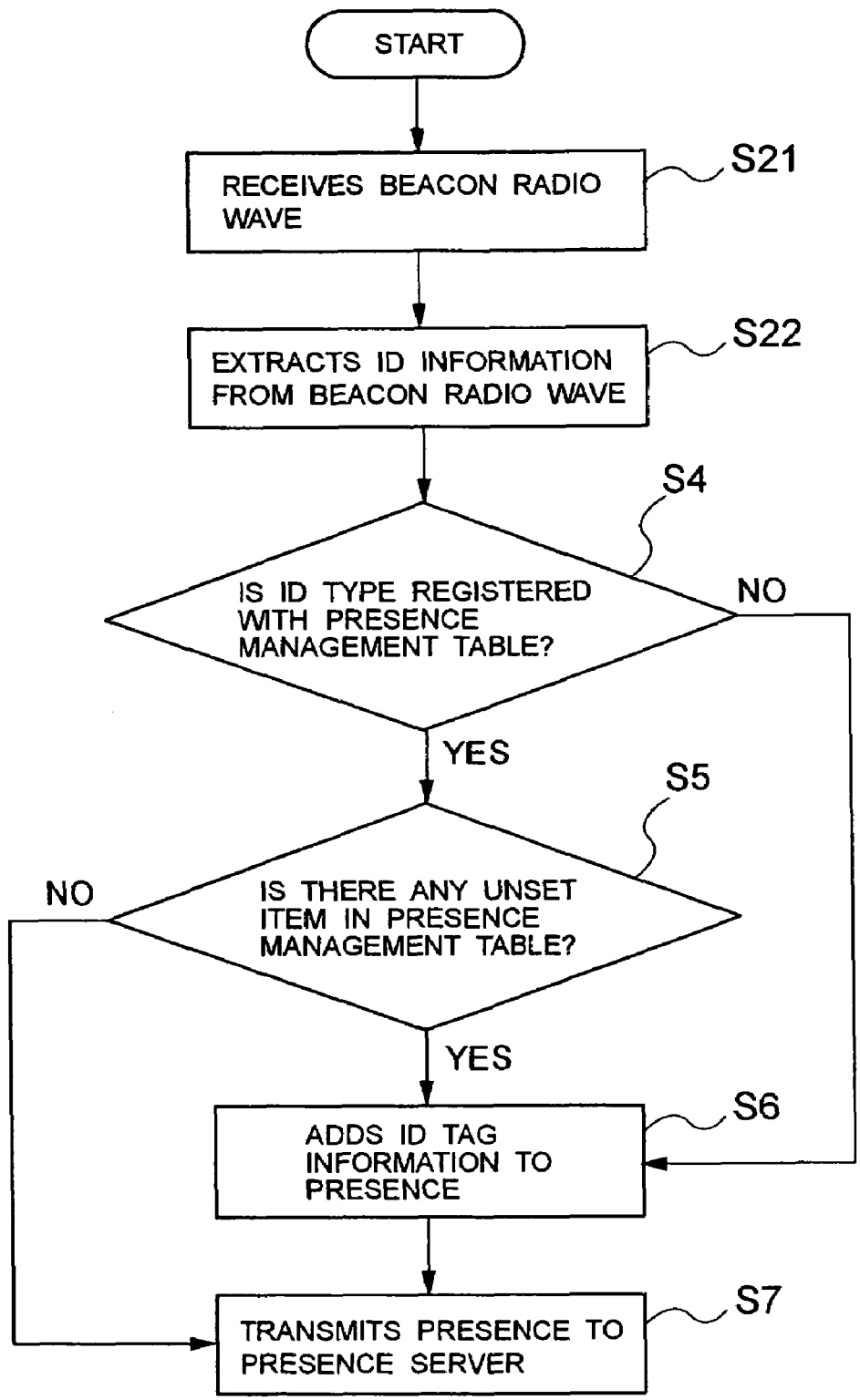
FIG. 9 is a flowchart showing the operation of the embodiment of FIG. 8.

FIG. 9 is a flowchart showing the operation of this embodiment, and steps equivalent to those in FIG. 5 are denoted by the same reference symbols. In this example, when the user of the mobile phone 101 comes close to the beacon 106, the low-power-output transmission/receiving section 16 receives a radio wave from the beacon 106 (step S21). In this beacon radio wave, the same information as the ID tag information shown in FIG. 4 is included. Accordingly, the ID type of the beacon radio wave is extracted (step S22), the presence management table 18 is searched, and the processing through the steps S4 to S7 is performed.

Figure 10:
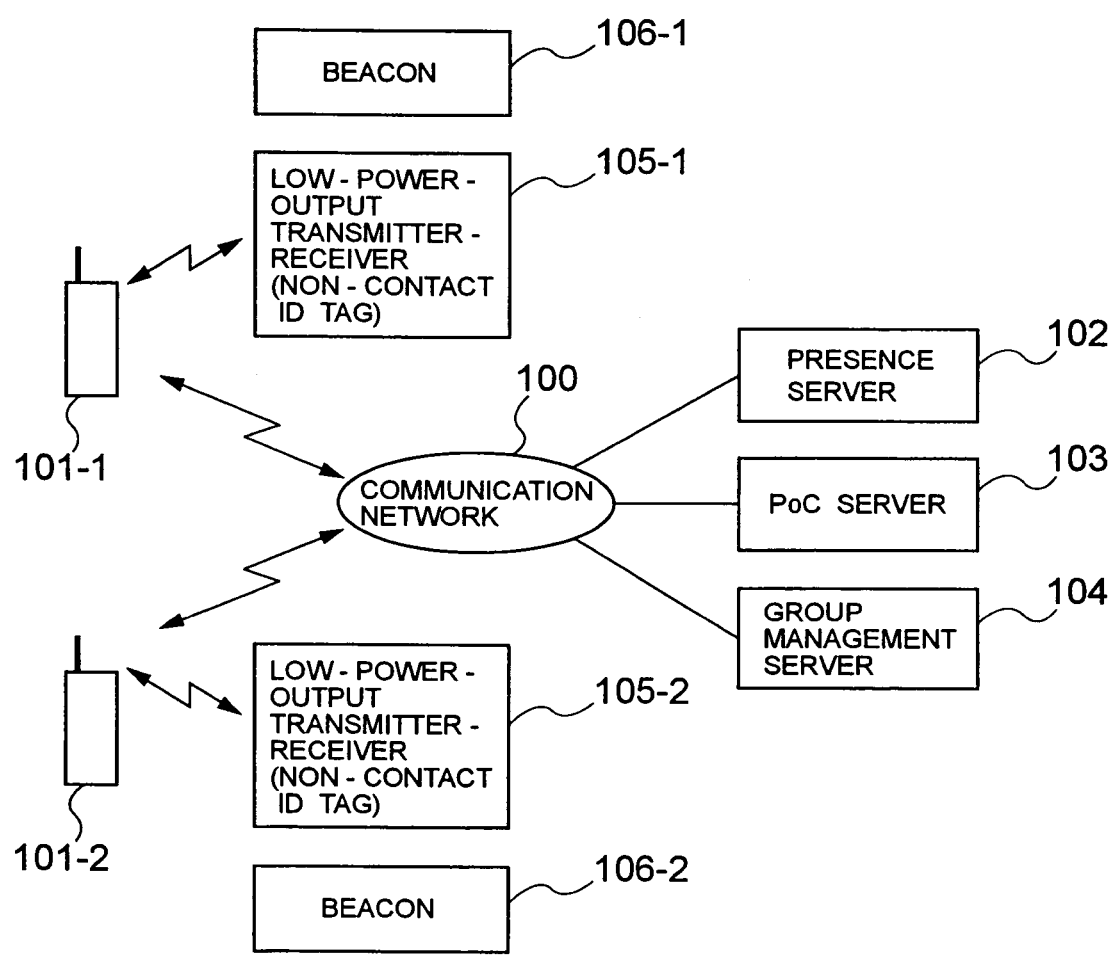
FIG. 10 is a system configuration diagram of another embodiment of the present invention.

FIG. 10 is a system configuration diagram of another embodiment, and sections equivalent to those in FIGS. 1 and 8 are denoted by the same reference numerals. In this example, the beacon 106 and the low-power-output transmitter-receiver 105 are used in combination. The beacon 106 used here is used for the purpose of notifying the existence of the low-power-output transmitter-receiver 105. Therefore, information is not attached to the radio wave originated by the beacon.

Figure 11:
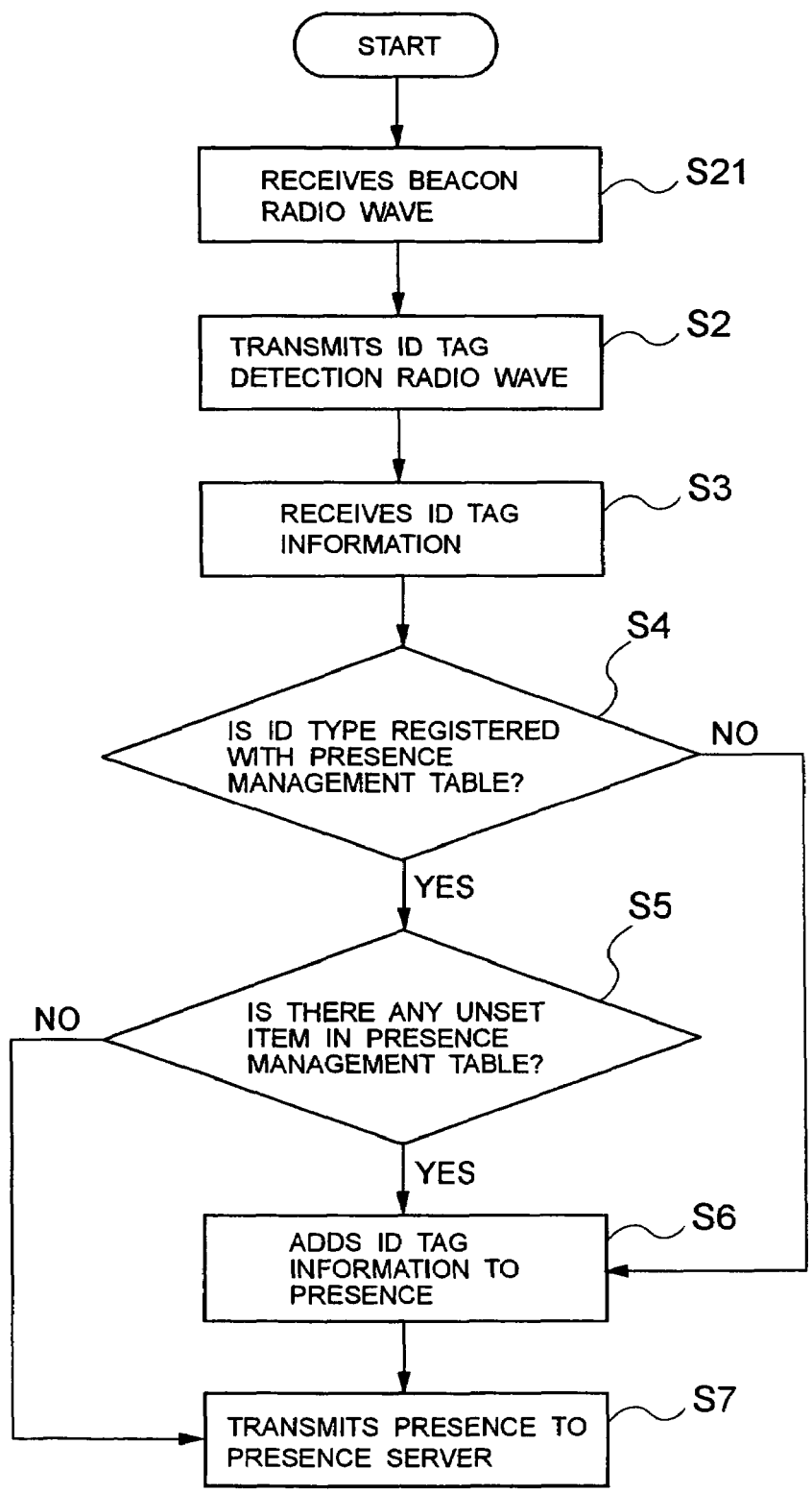
FIG. 11 is a flow chart showing the operation of the embodiment of FIG. 10.

FIG. 11 is a flowchart showing the operation of this embodiment, and sections equivalent to those in FIGS. 5 and 9 are denoted by the same reference symbols. When the user of the mobile phone 101 comes close to the beacon 106, the low-power-output transmission/receiving section 16 receives the radio wave from the beacon (step S21). The receiving of the beacon radio wave is a trigger to perform the operation of the subsequent steps S2 to S7.

In each of the embodiments described above, an expiration period can be set for the ID tag information. For example, if the entrance and the exit are the same at a place such as a theater, and one low-power-output transmitter-receiver 105 is commonly installed at the entrance and the exit, then correct presence can be set at the entrance, but presence of "theater" is again set at the exit. Accordingly, in order to solve this problem, an expiration period is set for the ID tag information so that it is compared with the up-to-date presence.

If the presence is "theater", expiration period information is included in the ID tag information, and the expiration period is set, for example, as three hours. A mobile phone receives the ID tag information which includes "theater", transmits it to the presence server 102, and holds the up-to-date ID tag information as history information. When receiving the ID tag information indicating "theater" again, the mobile phone checks the presence expiration period it holds. Then, if it receives the same kind of presence within the expiration period, the mobile phone does not update the presence and discards the received ID tag information.

If the expiration period has already ended, the mobile phone discards the history information it holds. In this case, the presence is updated with the received ID tag information. Thereby, when a non-contact ID tag exists near the mobile phone, communication for updating the presence is restricted, and thereby power consumption is reduced.

If received ID tag information is immediately set in a presence server as presence information as described above, privacy information about the user is also set. Therefore, it is considered to prevent the setting for the "location/condition" shown in FIG. 3 from being notified to the presence server 102 by the user making settings therefor. For example, it is possible to set "home" or "home/bed room" as being not to be notified and transmit only "communication permission/refusal" to the presence server as presence information.

As another example, an item for setting a privacy level is added to the ID tag information. Five privacy levels, for example, Level 1 to Level 5 are prepared so that a lower level may be set for a private entry and a higher level may be set for a public entry. A user can set the privacy level when updating the presence. For example, Level 1 is set for "home", Level 3 for "company", and Level 5 for "station". If the user sets Level 1, settings for "location/condition" related to his home can be prevented from being notified to the presence server.

Though a mobile phone has been used in the embodiments described above, it is possible to use a mobile communication terminal having a communication function. It is apparent that an operation procedure for the operation flow of each of the embodiments described above is recorded in a ROM 14 as a program in advance so that the program is read and executed by the CPU 12. It goes without saying that the system of the present invention, in which a low-power-output transmitter-receiver or a beacon is used, can be widely applied to a ticket checking and collecting system at a station, for which a non-contact commuter pass is used, an electronic key authentication system for automobiles, and an entrance/exit system for companies.

According to the present invention, presence can be automatically updated while a user is carrying a mobile communication terminal such as a mobile phone, and thereby, advantageously, the user is not required to do a troublesome operation, and it is possible to set up-to-date presence. It is also advantageous that unexpected receiving of communication can be prevented by registering a table showing the condition of the user and communication permission/refusal at each location in advance and updating presence based on the condition and communication permission/refusal for the current location extracted from the table.

What is claimed is:

1. A presence update system for transmitting up-to-date presence information indicating the location or the condition of a user of a mobile communication terminal, to a presence management apparatus, the system comprising: a non-contact communication apparatus configured to transmit information indicating at least an installation place; and the mobile communication terminal comprising: a registration element with which information indicating the location of the user or the condition of the user at the location is registered in advance; a receiving element for receiving information from the non-contact communication apparatus; and a transmission element for generating the presence information based on information in the registration element corresponding to the installation place in the received information and transmitting the presence information to the presence management apparatus, wherein information indicating communication permission/refusal at the installation place is also registered with the registration element, and the transmission element is adapted to generate and transmit the presence information with the information indicating communication permission/refusal included therein; wherein information about an expiration period is added to the information from the non-contact communication apparatus; and the mobile communication terminal further comprises means for holding the information with the expiration period information added thereto, and is adapted to, if the information from the non-contact communication apparatus is identical to held information, refer to the expiration period and perform a control to discard the identical information.

2. The presence update system according to claim 1, wherein the non-contact communication apparatus is an RF-ID tag, and the receiving element of the mobile communication terminal is a reader for reading information stored in the RF-ID tag.

3. The presence update system according to claim 2, further comprising an apparatus for transmitting a radio wave indicating the installation place of the RF-ID tag, wherein the receiving element of the mobile communication terminal is adapted to receive the information from the non-contact communication terminal in response to receiving the radio wave.

4. The presence update system according to claim 1, wherein the receiving element is adapted to receive information from the non-contact communication apparatus in response to an operation by the user.

5. The presence update system according to claim 1, wherein the receiving element is adapted to receive the information from the non-contact communication apparatus at a predetermined timing.

6. The presence update system according to claim 1, wherein the transmission element of the mobile communication terminal is adapted to control permission/refusal of transmission of the information indicating the location or the condition of the user, based on information indicating the privacy level set in accordance with a user operation.

7. A presence update method for transmitting up-to-date presence information indicating the location or the condition of a user of a mobile communication terminal, to a presence management apparatus, wherein: there is provided a non-contact communication capable of transmitting information indicating at least an installation place; and the method comprising: a receiving step of receiving information from the non-contact communication apparatus in the mobile communication terminal; a generation step of generating the presence information based on registration information corresponding to the installation place in the information received by the receiving step from among registration information in registration element with which information, indicating the location of a user or the condition of the user at the location, is registered in advance; and a transmission step of transmitting the generated information to the presence management apparatus, wherein information indicating communication permission/refusal at the installation place is also registered with the registration element, and the generation step is adapted to generate the presence information with the information indicating communication permission/refusal included therein; wherein information about an expiration period is added to the information from the non-contact communication apparatus: and the mobile communication terminal further comprises means for holding the information with the expiration period information added thereto, and is adapted to, if the information from the non-contact communication apparatus is identical to held information, refer to the expiration period and perform a control to discard the identical information.

8. The presence update method according to claim 7, wherein the receiving step is adapted to receive information from the non-contact communication apparatus in response to an operation by the user.

9. The presence update method according to claim 7, wherein the receiving step is adapted to receive the information from the non-contact communication apparatus at a predetermined timing.

10. The presence update method according to claim 9, wherein an apparatus for transmitting a radio wave indicating the installation place of the RF-ID tag is provided, and the receiving step is adapted to receive the information from the non-contact communication terminal in response to receiving the radio wave.

11. The presence update method according to claim 7, wherein information about an expiration period is added to the information from the non-contact communication apparatus; and the method further comprises a step of holding the information with the expiration period information added thereto in the mobile communication terminal and a step of, if the information from the non-contact communication apparatus is identical to the held information, referring to the expiration period and performing a control to discard the identical information.

12. The presence update method according to claim 7, wherein the transmission step is adapted to control permission/refusal of transmission of the information indicating the location or the condition of the user based on information indicating the privacy level set in accordance with a user operation.

13. A mobile communication terminal adapted to transmit up-to-date presence information indicating the location or the condition of a user, to a presence management apparatus, the mobile communication terminal comprising: a registration element with which information indicating the location of the user or the condition of the user at the location is registered in advance; a receiving element for receiving information indicating at least an installation place and transmitted from a non-contact communication apparatus; and a transmission element for generating the presence information based on information in the registration element corresponding to the installation place in the received information and transmitting the presence information to the presence management apparatus, wherein information indicating communication permission/refusal at the installation place is also registered with the registration element, and the transmission element is adapted to generate and transmit the presence information with the information indicating communication permission/refusal included therein; wherein information about an expiration period is added to the information from the non-contact communication apparatus: and the mobile communication terminal further comprises means for holding the information with the expiration period information added thereto, and is adapted to, if the information from the non-contact communication apparatus is identical to held information, refer to the expiration period and perform a control to discard the identical information.

14. The mobile communication terminal according to claim 13, wherein the non-contact communication apparatus is an RF-ID tag, and the receiving element is a reader for reading information stored in the RF-ID tag.

15. The mobile communication terminal according to claim 13, wherein the receiving element is adapted to receive information from the non-contact communication apparatus in response to an operation by the user.

16. The mobile communication terminal according to claim 13, wherein the receiving element is adapted to receive the information from the non-contact communication apparatus at a predetermined timing.

17. The mobile communication terminal according to claim 16, wherein the receiving element is adapted to receive the information from the non-contact communication terminal in response to receiving, from an apparatus for transmitting a radio wave, a radio wave indicating the installation place of the RF-ID tag.

18. The mobile communication terminal according to claim 13, wherein information about an expiration period is added to the information from the non-contact communication apparatus; and the mobile communication terminal further comprises means for holding the information with the expiration period information added thereto; and is adapted to, if the information from the non-contact communication apparatus is identical to the held information, refer to the expiration period and perform a control to discard the identical information.

19. The mobile communication terminal according to claim 13, wherein the transmission element is adapted to control permission/refusal of transmission of the information indicating the location or the condition of the user based on information indicating the privacy level set in accordance with a user operation.

20. A program for causing a computer to perform the operation of a mobile communication terminal adapted to transmit up-to-date presence information indicating the location or the condition of a user, to a presence management apparatus, the program comprising: a process of receiving information indicating at least an installation place and transmitted from a non-contact communication apparatus; and a process of generating the presence information based on information corresponding to the installation place in the received information, among registration information in registration element with which information about the location of a user or the condition of the user at the location is registered in advance, and transmitting the presence information to the presence management apparatus, wherein information indicating communication permission/refusal at the installation place is also registered with the registration element, and the transmission element is adapted to generate and transmit the presence information with the information indicating communication permission/refusal included therein; wherein information about an expiration period is added to the information from the non-contact communication apparatus; and the mobile communication terminal further comprises means for holding the information with the expiration period information added thereto, and is adapted to, if the information from the non-contact communication apparatus is identical to held information, refer to the expiration period and perform a control to discard the identical information.

* * * * *